Patented Mar. 22, 1927.

1,621,927

UNITED STATES PATENT OFFICE.

ALFRED W. GAUGER AND HENRY HERMAN STORCH, OF WESTEND, CALIFORNIA, ASSIGNORS TO BURNHAM CHEMICAL COMPANY, OF RENO, NEVADA, A CORPORATION OF NEVADA.

PROCESS OF DECREASING THE RATE OF CRYSTALLIZATION OF BORAX FROM BRINE.

No Drawing.   Application filed August 29, 1925. Serial No. 53,425.

The invention relates to a process of lessening the rate of crystallization of borax (sodium tetraborate decahydrate) from brine, particularly from brine containing sodium, potassium, chloride, carbonate, sulphate, metaborate and tetraborate.

An object of the invention is to provide a process whereby the rate of crystallization of borax from such brine may be decreased from its usual value.

Another object of the invention is to provide a process by means of which borax may be retained in a brine containing other salts until the other salts have crystallized.

Other objects of the invention together with the foregoing will be set forth in the following description where we shall outline in full one form of the process of our invention. It is to be understood that we do not limit ourselves to such form as the invention as set forth in the claims may be practiced in a plurality of forms.

The various salts may be recovered from such brines by evaporation and cooling. The brine is preferably evaporated, by the application of heat, either natural or artificial, until the brine becomes saturated with one or more of the contained salts. The brine is then cooled and preferably agitated, causing various salts to precipitate from the supersaturated saline solution. The different salts precipitate within different temperature ranges so that it is a comparatively easy matter to recover them separately as the brine cools from its maximum temperature to its minimum temperature. Borax, however, crystallizes in various amounts substantially thruout the temperature range and is precipitated with the other salts and mixes with them as an impurity.

We have found by experiment that various organic substances when introduced into the brine act as negative catalysts and retard the crystallization of borax. The borax precipitation may be delayed or decreased so that the various salts crystallized out are substantially free of the borax impurity.

A number of organic materials, principally wood products or extracts, have been found suitable for use as negative catalysts from the standpoints of both economy and effectiveness, among which are extract of creosote bush, commercial rosin, and extract of coniferous sawdust. The extract of creosote bush is prepared by heating creosote bush (*Larrea mexicana*) with sodium carbonate solution, and is preferably introduced into the brine to be evaporated in the proportion of about one tenth of one per cent. The extract of coniferous sawdust is also made with sodium carbonate solution and in a similar manner but is preferably used in the proportion of about one twentieth of one per cent. Commercial rosin has the same effect as the other wood extracts when added in the proportion of about one twentieth of one per cent.

Any of the above mentioned substances when added to the brine act as negative catalysts which decrease the rate of crystallization of the borax.

We claim:

1. The process of decreasing the rate of crystallization of borax from brine containing sodium, potassium, chloride, carbonate, sulfate, metaborate, and tetraborate which comprises adding a resinous organic material to the brine and subjecting the brine to treatment to crystallize out other salts.

2. The process of decreasing the rate of crystallization of borax from brine containing sodium potassium, chloride, carbonate, sulfate, metaborate, and tetraborate which comprises adding a wood extract to the brine and subjecting the brine to treatment to crystallize out other salts.

3. The process of decreasing the rate of crystallization of borax from brine containing sodium, potassium, chloride, carbonate, sulfate, metaborate, and tetraborate which comprises adding extract of creosote bush to the brine and subjecting the brine to treatment to crystallize out other salts.

4. The process of decreasing the rate of crystallization of borax from brine containing sodium, potassium, chloride, carbonate, sulfate, metaborate, and tetraborate which comprises adding about one tenth of one per cent of extract of creosote bush to the brine and subjecting the brine to treatment to crystallize out other salts.

In testimony whereof, we have hereunto set our hands.

ALFRED W. GAUGER.
HENRY HERMAN STORCH.